UNITED STATES PATENT OFFICE.

MAXIM SCHWARZ, OF HILDEN, GERMANY, ASSIGNOR TO FARBENFABRIKEN VORM. FRIEDR. BAYER & CO., OF ELBERFELD, GERMANY, A CORPORATION OF GERMANY.

PROCESS OF PRINTING.

992,270.　　Specification of Letters Patent.　　Patented May 16, 1911.

No Drawing.　　Application filed October 20, 1908.　Serial No. 458,594.

*To all whom it may concern:*

Be it known that I, MAXIM SCHWARZ, chemist and colorist, citizen of the German Empire, residing at Hilden, Rhineland, Kingdom of Prussia, Germany, have invented new and useful Improvements in Processes of Printing, of which the following is a specification.

I have found that prints of extraordinary intensity, beauty and cheapness can be obtained from sulfur colors, if starch paste is used as a thickening agent, which has been prepared from starch by heating it with dilute alkalis, until a clear paste is obtained.

Starch pastes prepared from starch by heating it with dilute alkalis are essentially different in their character from pastes obtained by heating starch with water. When heated with water the starch granules swell up, burst, partially dissolve and form the known milky "starch paste." When heated with caustic alkali, a clear paste results, wherein the character of the starch is totally changed. This paste has properties totally different from those of the preparations made with water or a paste to which alkali is added after it has been made by heating starch with water. Thickening agents other than starches do not give the same results.

The following examples may illustrate my invention, the parts being by weight:

*Preparation of paste.*—40 parts of maize starch are mixed at ordinary temperature with 600 parts of water and 10 parts of caustic soda lye (40° Bé.) and then heated until a clear paste is obtained.

*Preparation of color solution.*—Mix together: 80 parts of Katigen-black T extra (free from sodium sulfid), 200 parts of hot water, 40 parts of glucose, 150 parts of caustic soda lye (40° Bé.). Keep this mixture 1 to 2 hours at 55 to 75° C. until the reduction of the dyestuff is completed and a solution results. It is advisable to allow the solution to stand for 24 hours. The dye solution is then introduced into 400 to 500 parts of the thickening agent which is previously heated to about 50 to 55° C. and which is stirred all the time, the stirring to be continued at this temperature for about 1 to 2 hours. The mixture is then allowed to stand for about 24 hours and 50 to 100 parts of caustic soda lye (40° Bé.) and 20 to 30 parts of glucose are added to it; it is then printed on cotton and the printed goods are steamed for 4 to 5 minutes with steam free from air, and finished in the usual way.

The process is carried out in an analogous manner on using other sulfur dyestuffs, or other sorts of starch *e. g.* wheat starch, potato starch, tapioca starch, etc.

Having now particularly described my invention and in what manner the same is to be performed, I declare that what I claim is:—

In the art of printing sulfur colors on vegetable materials, the process of printing consisting of heating starches with a dilute solution of a caustic alkali until a clear paste is obtained, adding the thus obtained starch paste as a thickening agent to solutions of sulfur colors, printing the mass prepared in this manner on textiles and finishing them, substantially as described.

In testimony whereof I have hereunto set my hand in the presence of two subscribing witnesses.

MAXIM SCHWARZ. [L. S.]

Witnesses:
　OTTO KÖNIG,
　WALTER J. KAMP.